(12) United States Patent
Han et al.

(10) Patent No.: US 11,457,503 B2
(45) Date of Patent: Sep. 27, 2022

(54) RE-TRANSMISSION OF PDCP PDUS BY CENTRALIZED NODES OF A RAN ARCHITECTURE

(71) Applicant: Apple Inc., Cupertino, CA (US)

(72) Inventors: Jaemin Han, Portland, OR (US); Yujian Zhang, Beijing (CN); Alexander Sirotkin, Hod Hasharon (IL); Xu Zhang, Beijing (CN); Yifan Yu, Beijing (CN); Min Huang, Beijing (CN); Feng Yang, Beijing (CN); Sudeep Palat, Cheltenham (GB)

(73) Assignee: Apple Inc., Cupertino, CA (US)

( * ) Notice: Subject to any disclaimer, the term of this patent is extended or adjusted under 35 U.S.C. 154(b) by 149 days.

(21) Appl. No.: 16/487,173

(22) PCT Filed: Mar. 16, 2018

(86) PCT No.: PCT/US2018/022827
§ 371 (c)(1),
(2) Date: Aug. 20, 2019

(87) PCT Pub. No.: WO2018/170377
PCT Pub. Date: Sep. 20, 2018

(65) Prior Publication Data
US 2020/0029390 A1 Jan. 23, 2020

Related U.S. Application Data

(60) Provisional application No. 62/472,975, filed on Mar. 17, 2017.

(51) Int. Cl.
*H04W 80/02* (2009.01)
*H04W 76/10* (2018.01)
(Continued)

(52) U.S. Cl.
CPC ........... *H04W 80/02* (2013.01); *H04L 1/1858* (2013.01); *H04L 69/16* (2013.01); *H04W 28/06* (2013.01); *H04W 76/10* (2018.02)

(58) Field of Classification Search
None
See application file for complete search history.

(56) References Cited

U.S. PATENT DOCUMENTS

2017/0359848 A1* 12/2017 Tenny .................. H04W 64/00
2018/0013481 A1* 1/2018 Guo ..................... H04B 7/086
(Continued)

FOREIGN PATENT DOCUMENTS

WO    2015/018535 A1    2/2015

OTHER PUBLICATIONS

International Search Report dated Jun. 20, 2018 for International Application No. PCT/US2018/022827.
(Continued)

*Primary Examiner* — Hassan A Phillips
*Assistant Examiner* — Gautam Sharma
(74) *Attorney, Agent, or Firm* — Eschweiler & Potashnik, LLC

(57) ABSTRACT

A centralized RAN architecture that includes lower layer transmission nodes (referred to as distributed units (DUs) herein) that connect to an upper layer RAN node (referred to as a centralized unit (CU) herein). A centralized RAN architecture may include a functional split, between the CU and DU, corresponding to the Packet Data Convergence Protocol (PDCP) and Radio Link Control (RLC) layers. In one embodiment, a CU may store copies of downlink PDCP PDUs that are transmitted to a first DU. The CU may retransmit, to a second DU, those of the PDCP PDUs which
(Continued)

were previously transmitted to the source DU but have not been acknowledged as successfully delivered by the source DU.

11 Claims, 9 Drawing Sheets

(51) Int. Cl.
*H04L 1/18* (2006.01)
*H04L 69/16* (2022.01)
*H04W 28/06* (2009.01)

(56) References Cited

U.S. PATENT DOCUMENTS

| | | | |
|---|---|---|---|
| 2018/0049261 A1* | 2/2018 | Tenny | H04W 76/15 |
| 2018/0376380 A1* | 12/2018 | Leroux | H04W 76/18 |
| 2019/0053120 A1* | 2/2019 | Park | H04W 76/27 |
| 2019/0059039 A1* | 2/2019 | Centonza | H04W 76/15 |
| 2019/0069333 A1* | 2/2019 | Kim | H04W 36/0033 |
| 2019/0098544 A1* | 3/2019 | Han | H04W 72/1205 |
| 2019/0149365 A1* | 5/2019 | Chatterjee | H04L 5/0092 370/329 |
| 2019/0289585 A1* | 9/2019 | Cai | H04W 88/085 |
| 2019/0313244 A1* | 10/2019 | Wang | H04W 8/26 |
| 2019/0380158 A1* | 12/2019 | Gao | H04W 76/12 |
| 2019/0387444 A1* | 12/2019 | Byun | H04W 36/0072 |
| 2019/0394826 A1* | 12/2019 | Wang | H04W 76/19 |
| 2020/0029390 A1* | 1/2020 | Han | H04W 80/00 |
| 2020/0045745 A1* | 2/2020 | Cirik | H04W 76/27 |
| 2020/0068652 A1* | 2/2020 | Xu | H04L 1/1896 |
| 2020/0077310 A1* | 3/2020 | Cheng | H04W 36/305 |
| 2020/0077466 A1* | 3/2020 | Liu | H04W 36/00 |
| 2020/0120572 A1* | 4/2020 | Fiorani | H04W 36/0069 |
| 2020/0154330 A1* | 5/2020 | Paladugu | H04W 76/15 |

OTHER PUBLICATIONS

3rd Generation Partnership Project; Technical Specification Group Radio Access Network; Study on new radio access technology: Radio access architecture and interfaces (Release 14). 3GPP TR 38.801 V14.0.0 (Mar. 2017). Advanced Pro Lte.
"Location of RLC ARQ in NR." Source: CATT. Agenda Item: 10.2.1.1. 3GPP TSG-RAN WG2 Meeting #97, Athens, Greece, Feb. 13-17, 2017. R2-1700966 (Revision of R2-1700195).
"Consideration of RAN function split between CU and DU." Source: CATT. Agenda Item: 10.5.1. 3GPP TSG RAN WG3 Meeting #93, Gothenburg, Sweden, Aug. 22-26, 2016. R3-161695.
International Preliminary Report on Patentability dated Sep. 17, 2019 for International Application No. PCT/US2018/022827.

* cited by examiner

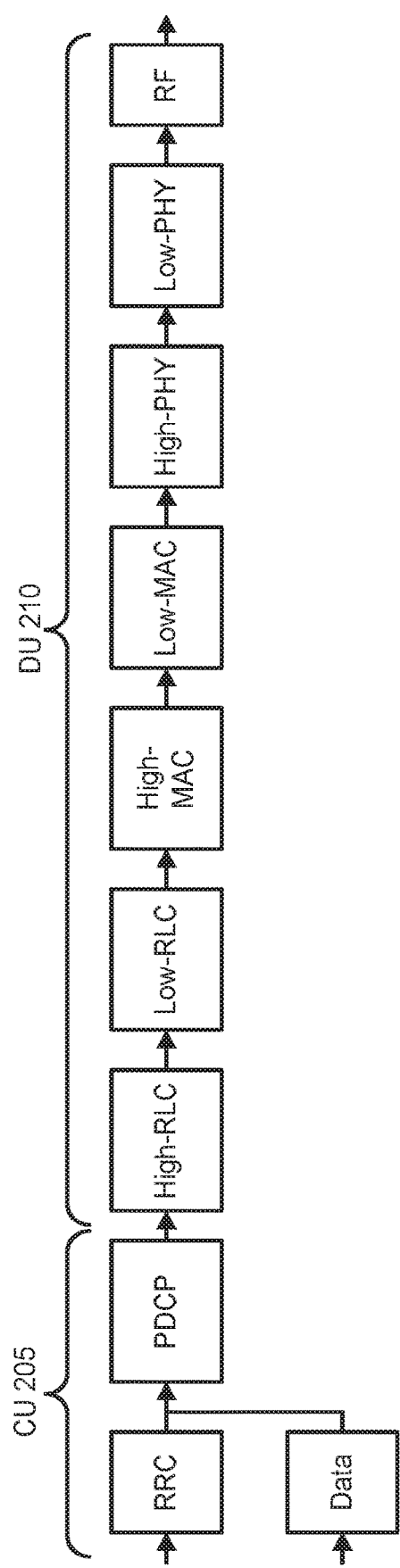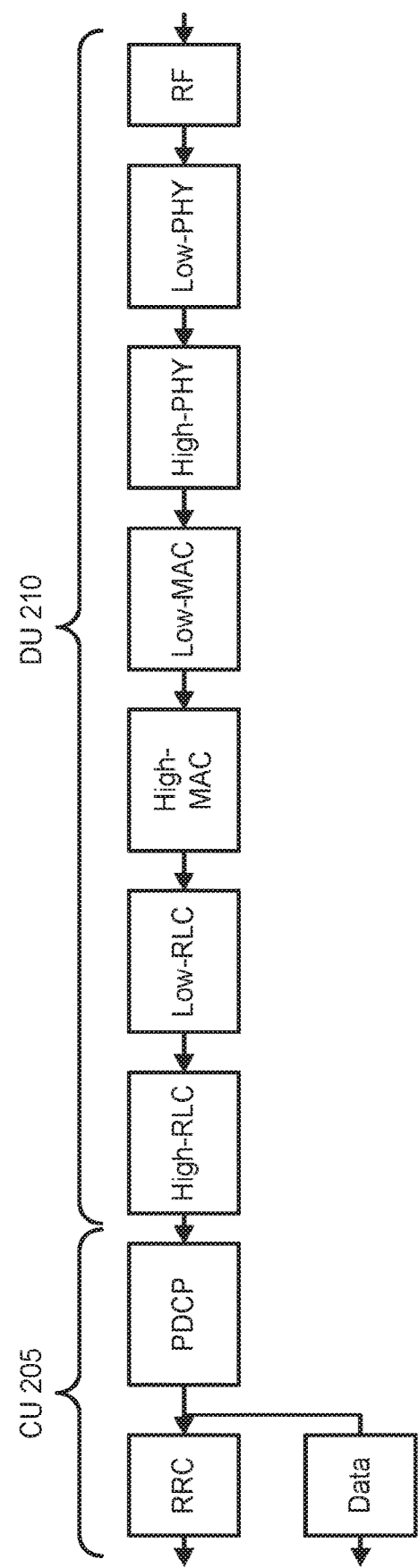
Fig. 3A
Fig. 3B

RE-TRANSMISSION OF PDCP PDUS BY CENTRALIZED NODES OF A RAN ARCHITECTURE

RELATED APPLICATIONS

This application is a National Phase entry application of International Patent Application No. PCT/US2018/022827 filed Mar. 16, 2018, which claims priority to U.S. Provisional Application No. 62/472,975, filed on Mar. 17, 2017, and is hereby incorporated by reference in its entirety.

BACKGROUND

An emerging wireless standard for wireless cellular networks is known as 5G New Radio (NR). The specifications for 5G NR are standardized as part of the Third Generation Partnership Project (3GPP) specifications with a goal of making wireless broadband performance comparable to that of wireline network connectivity. In 5G NR, a new Radio Access Technology (RAT), beyond the Long Term Evolution (LTE) standard, is used. The 5G RAT may be operable over a wide range of frequency bands, including from less than 6 GHz, to millimeter wave (mmWave) bands, to as high as 100 GHz.

The 5G NR Radio Access Network (RAN) architecture may support a number of different deployment scenarios, including both centralized and non-centralized deployments. In a non-centralized deployment, the RAN may include nodes that support the full RAN protocol stack. In a centralized deployment, the RAN may be deployed to support centralization of the upper layers of the radio stack. In this deployment, different protocol split options between a central unit and lower layer transmission nodes may be possible.

BRIEF DESCRIPTION OF THE DRAWINGS

Embodiments described herein will be readily understood by the following detailed description in conjunction with the accompanying drawings. To facilitate this description, like reference numerals may designate like structural elements. Embodiments are illustrated by way of example and not by way of limitation in the figures of the accompanying drawings.

FIGS. 3A and 3B are diagrams illustrating an LTE protocol stack, at a gNB, in the downlink direction (FIG. 3A) and uplink direction (FIG. 3B);

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Techniques described herein relate to User Equipment (UE) mobility in a centralized RAN architecture that includes lower layer transmission nodes (referred to as distributed units (DUs) or gNB-DUs herein) that connect to an upper layer RAN node (referred to as a centralized unit (CU) or gNB-CUs herein). When the UE is moving from one DU to another, it is desirable to support the UE in a transparent and lossless way such that packets not successfully delivered at a source DU can be retransmitted at a target DU.

In implementations described herein, the functional split, in the LTE protocol stack and between the CU and DU, is described as being between the Packet Data Convergence Protocol (PDCP) and Radio Link Control (RLC) layers. In particular, a number of techniques are described herein that implement centralized (i.e., via the CU) retransmission of Protocol Data Units (PDUs) when the UE is moving to another DU.

Consistent with aspects described herein, a CU may store copies of downlink PDCP PDUs that are transmitted to a first DU (e.g., a source DU). The CU may retransmit, to a second DU (e.g., a target DU), those of the PDCP PDUs which were previously transmitted to the source DU but have not been acknowledged as successfully delivered by the source DU.

Figure 1:
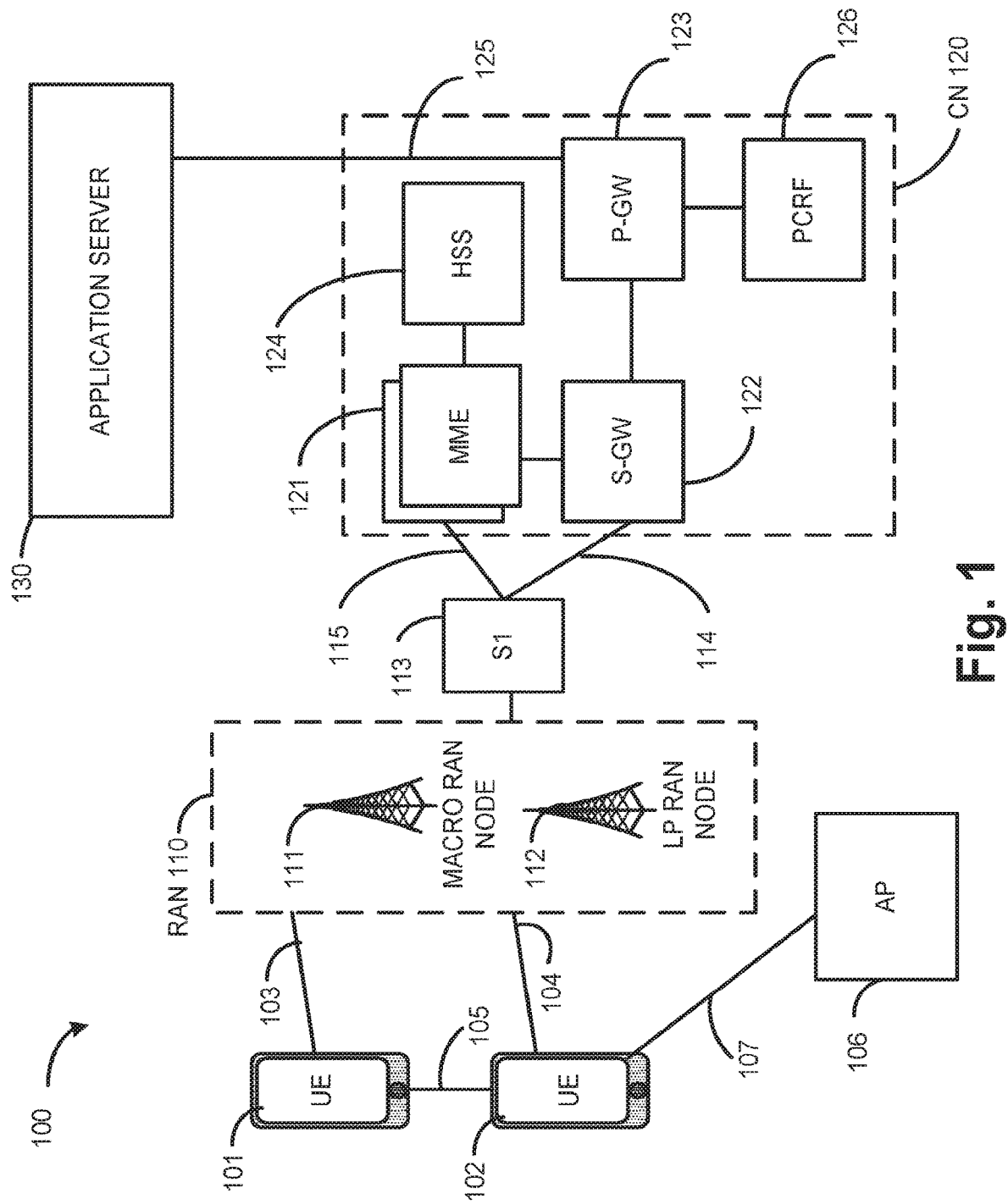
FIG. 1 illustrates an architecture of a system in accordance with some embodiments.

FIG. 1 illustrates an architecture of a system 100 in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IOT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG-RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UEs 101 and 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, Next Generation Core (NGC), or some other type of CN. In this embodiment, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121. In implementations in which RAN 110 represents a 5G architecture, the interface between the RAN and the core network may be referred to as the NG interface (where the RAN may include gNBs and the core network is referred to as the NGC). In this implementation, S1 interface 113 may be an NG interface.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
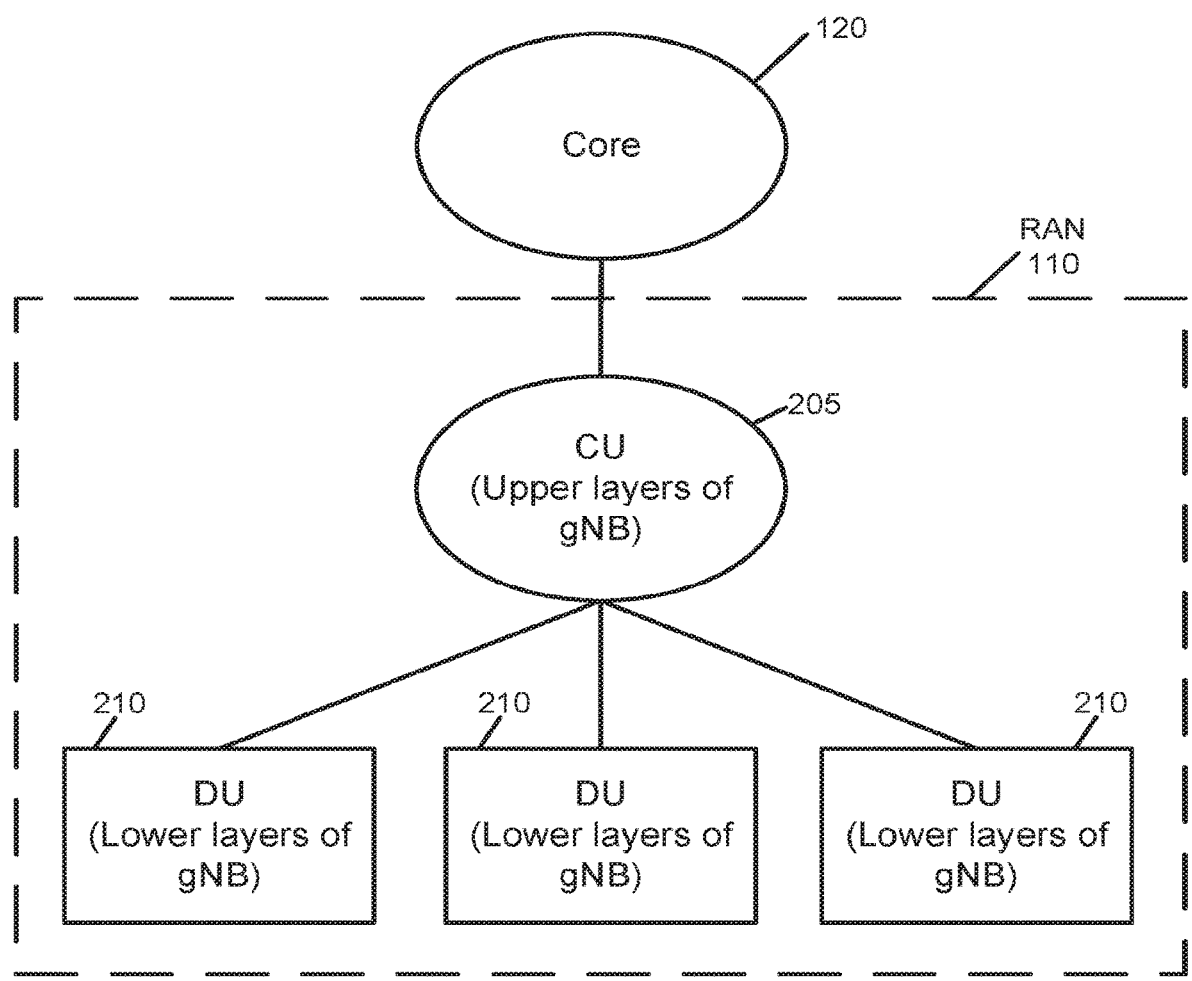
FIG. 2 is a diagram illustrating an example architecture for a 5G NR RAN centralized architecture.

FIG. 2 is a diagram illustrating an example architecture for a 5G NR RAN centralized architecture. As shown, RAN 110 may include a CU 205, which communicate with a number of DUs 210. Although a single CU 205 is shown in FIG. 2 for simplicity, in practice, RAN 110 may include a number of CUs, each connected to a plurality of DUs. Functionally, the combination of CU 205 and a DU 210 may implement the functions of a gNB macro RAN node, such as macro RAN node 111. That is, CU 205 and a DU 210 may together implement all the functional layers of a gNB, where CU 205 implements the upper layers of the gNB and each of DUs 210 implement the lower layers.

In implementations described herein, CU 205 may implement the Radio Resource Control (RRC) and Packet Data Convergence Protocol (PDCP) layers. In some implementations, CU 205 may further be split into two separate entities, one with control plane functionality (CU-CP) and the other with user plane functionality (CU-UP). DU 210 may implement the Radio Link Control (RLC), Media Access Control (MAC), Physical (PHY) and Radio Frequency (RF) layers.

FIGS. 3A and 3B are diagrams illustrating an LTE protocol stack, at a gNB, in the downlink direction (FIG. 3A) and uplink direction (FIG. 3B).

As is shown in FIGS. 3A and 3B, in implementations described herein, the functional split between layers of the protocol stack may be between the PDCP and RLC layers. That is, CU 205 may handle the RRC and PDCP layers and DU 210 may handle the RLC. MAC, PHY, and RF layers. In FIGS. 3A and 3B, the RLC layer is illustrated as being split into two functional components ("high-RLC" and "low-RLC"). Similarly, the MAC and PHY layers are each shown as being split into two functional components ("high-MAC" and "low-MAC"; and "high-PHY" and "low-PHY").

In some situations, such as when a UE moves between DUs, packets may potentially be lost. In a first embodiment described herein, a UE moving between DUs, such as between DUs of the same CU, may be supported in a transparent and lossless way such that packets that are not successfully delivered at the source DU are retransmitted, to the UE, at the target DU.

Figure 4:
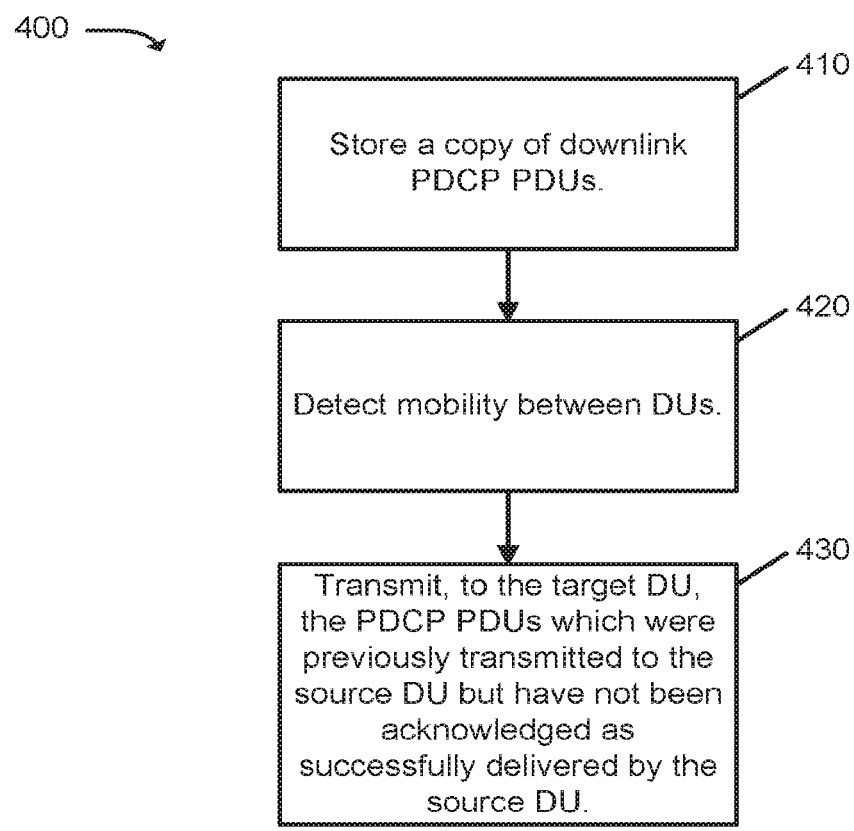
FIG. 4 is a flowchart illustrating an example process for retransmission of lost packets by a CU.

FIG. 4 is a flowchart illustrating an example process 400 for retransmission of lost packets by a CU. Process 400 may be implemented by, for example, CU 205. In some implementations, process 400 may particularly be performed at the PDCP layer of CU 205.

Process 400 may include CU 205 storing a copy of downlink PDCP packet data units (PDUs) (block 410). In one implementation, CU 205 may buffer downlink PDCP PDUs, intended for UEs 101/102 (referred to as UE 101 hereafter). The PDUs may be stored (buffered) by CU 205 until, for example, the PDUs are acknowledged as being successfully delivered to the UE.

Process 400 may further include detecting mobility (e.g., a handover) of the UE between DUs 210 (block 420). In one implementation, the movement of UE 101 may be part of normal UE mobility between DUs. The handover may be between an initial DU, referred to as the source DU herein, and the subsequent DU, referred to as the target DU herein.

Process 400 may further include transmitting, to the target DU, PDCP PDUs which were previously transmitted to the source DU but which have not been acknowledged as successfully delivered (e.g., indicated as undelivered) by the source DU (block 430). The target DU may then retransmit the PDCP PDUs to UE 101.

Although the operations described for process 400 were described as being based on UE mobility, in some implementations, PDCP PDUs may be retransmitted based on other factors, such as a radio link outage between a DU 210 and UE 101. For example, instead of detecting a handover (block 420), CU 205 may be informed of a radio link outage, for a particular UE, by the DU. CU 205 may then retransmit PDCP PDUs, to the particular UE, using another DU to which the particular UE is connected.

In another possible alternative implementation of process 400, CU 205 may not keep copies of PDCP PDUs that have been submitted to the RLC layer of the source DU. In this situation, the source DU may transmit unacknowledged RLC SDUs, which correspond to the PDCP PDUs, back to CU 205 for retransmission to the target DU.

In another possible implementation of process 400, before retransmission of the PDCP PDUs, the PDCP layer in CU 205 may trigger a PDCP status report, by the UE. The status report may indicate which PDCP PDUs, among the unacknowledged PDUs, have already been received by the UE. In this manner, unnecessary retransmissions may be avoided.

As previously mentioned, a PDCP PDU may correspond to one or more data units at the RLC layer (i.e., RLC PDUs). During a handover operation, if network state is not to be preserved, the downlink target DU, at the RLC layer, may begin by using sequence numbers that start from zero. However, if network state is to be preserved (e.g., when the UE and the source DU have been communicating with each other before the UE moves to the target DU), then it may be desirable to initialize the state of the RLC layer, at UE 101, to a state that can be used to preserve continuity during the handover operation.

In an embodiment, the state of the UE RLC layer can be preserved using Radio Resource Control (RRC) signaling. Alternatively or additionally, the target may send a special RLC control PDU. The reserved Control PDU Type (CPT) field can be used, for example, for the purpose of initializing the state of the RLC layer of the UE. The CPT field is a field in an RLC control PDU that includes bits associated with unassigned values. The previously unassigned values may be assigned and used to communicate the state. Alternatively or additionally, a new RLC data PDU format may be introduced. The new RLC data PDU format may include an additional 1-bit field in the header that indicates, when the 1-bit field is set, that the RLC layer is to be initialized before processing. The RLC layer in the target DU may set the 1-bit field for the first transmitted RLC PDU, and in response, UE 101 and the target DU may subsequently exchange the state of the UE RLC layer.

In another embodiment, unacknowledged RLC PDUs may be forwarded to the target DU. More particularly, in order to retransmit RLC PDUs buffered at the RLC layer of the source DU, such as may be needed when the UE is moving to another DU, RLC PDUs that are unacknowledged as being received by the UE, may be forwarded to the target DU for retransmission to the UE. The UE may then concatenate RLC Service Data Units (SDUs) from the RLC PDUs that are received from either or both of the source DU and the target DU. RLC layer state information (such as values of RLC state variables) may also be transferred from the source DU to the target DU. In some implementations, the network (e.g., either CU 205 or DU 210) may trigger UE 101 to send an RLC status report, including information relating to missing segments of a RLC SDU before initiating retransmission, by the target DU, to avoid unnecessary retransmission.

In some of the embodiments discussed previously, unacknowledged RLC PDUs were described as being forwarded to the target DU. In another possible embodiment, instead of forwarding the unacknowledged RLC PDUs, information describing missing segments of RLC SDUs (PDCP PDUs) may be provided to the target DU. The target DU may then reproduce the unacknowledged RLC PDUs, using the associated RLC SDUs (PDCP PDUs) information provided, and transmit to UE 101.

Figure 5:
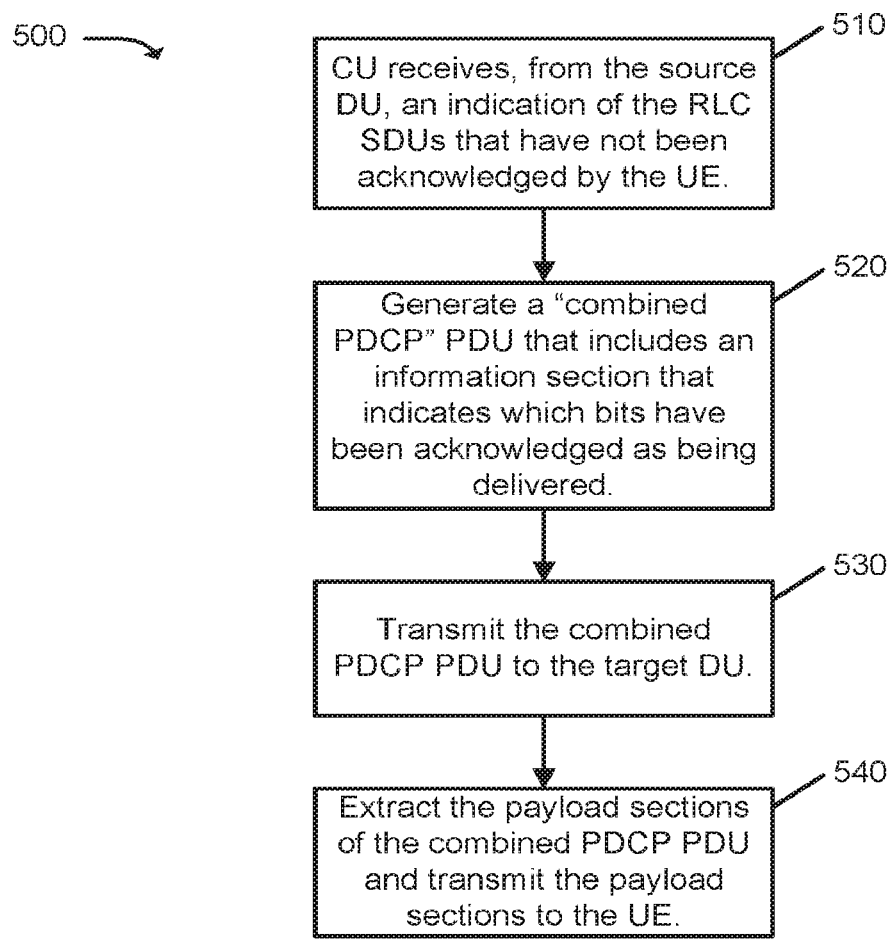
FIG. 5 is a flowchart illustrating an example process through which Radio Link Control (RLC) Protocol Data Units (PDUs) that are unacknowledged, by the UE, as being delivered, by a source DU, can be reproduced by the target DU and transmitted to the UE.

FIG. 5 is a flowchart illustrating an example process 500 through which RLC PDUs that are unacknowledged, by the UE, as being delivered, by a source DU, can be reproduced by the target DU and transmitted to the UE.

Process 500 may include receiving, by CU 205, and from the source DU, an indication of the RLC PDUs that have not been acknowledged by the UE (block 510). For example, the source DU may notify CU 205 of the RLC PDUs that have been transmitted to the UE but have not been acknowledged by the by the UE as being received. In one implementation, the notification may be implemented as one or more bit ranges that correspond to the unacknowledged RLC PDUs within a PDCP PDU.

Process 500 may further include generating, by CU 205, a combined PDCP PDU that includes an information section that indicates portions of the combined PDCP PDU have been acknowledged as being delivered (block 520). The information section may include information describing which bits, of the PDCP PDU, that have been acknowledged, by the UE, as being received by the UE.

Figure 6:
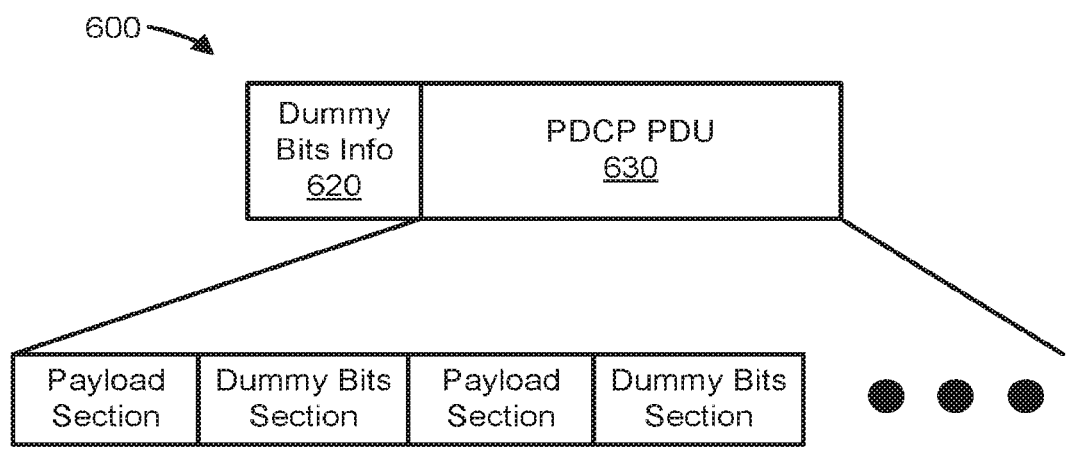
FIG. 6 is a diagram illustrating an example of a combined PDCP PDU generated by CU 205.

FIG. 6 is a diagram illustrating an example of a combined PDCP PDU generated by CU 205. As shown, in this example, combined PDCP PDU 600 include "dummy bits info" section 620 and a PDCP PDU section 630. Dummy bits information section 620 may include the information describing the bits that have been acknowledged, by the UE, as being received by the UE. PDCP PDU section 630 may be a PDCP PDU, which may encapsulate multiple RLC PDUs. Dummy bits information section 620 may describe the portions of PDCP PDU 630 that are "dummy bits" (i.e., the bits that have been acknowledged by the UE as being received and thus that do not need to be delivered again). The non-dummy bits are labeled as "payload sections." The payload sections thus refer to the portions of the PDCP PDU that have not been acknowledged by the UE (i.e., the portions that should be transmitted to UE 101).

Referring back to FIG. 4, process 500 may further include transmitting combined PDCP PDU 600 to the target DU (block 530). The target DU may then extract the payload sections of PDCP PDU 600 and transmit the payload sections, as RLC PDUs, to UE 101 (block 540).

In one possible variation relating to process 500, in scenarios in which the PDCP layer in CU 205 does not keep copies of PDCP PDUs that have been submitted to the RLC layer of the source DU, the source DU may generate combined PDCP PDU 600 and send combined PDCP PDU 600 to the target DU via CU 205. Additionally, RLC state information may be preserved during UE mobility in order for the UE to reconstruct RLC SDUs from the RLC PDUs received from the source DU and target DU RLC state information may accordingly be transferred from the source DU to the target DU.

In some implementations, before initiating retransmission by the target DU, the network (e.g., either CU 205 or DU 210) may trigger UE 101 to send an RLC status report, including information relating to missing segments of a RLC SDU.

The concepts described previously related to downlink enhancements for retransmission of PDCP PDUs. Concepts relating to the uplink direction (data transmitted from the UE to the network) will next be described.

In a first embodiment relating to uplink retransmission, retransmission of unacknowledged PDCP PDUs to the DU may be performed by providing an explicit indication to UE 101 to retransmit the uplink PDCP PDUs. The indication may be provided to the UE in a number of ways, such as through RRC signaling or via a special RLC control PDU that is transmitted to UE 101. For example, in the case of the control PDU, the CPT field may be used to notify the UE to retransmit the unacknowledged PDCP PDUs to the target DU. Alternatively or additionally, a PDCP control PDU (e.g. PDCP status report) may be transmitted to UE 101 that includes an indication of which PDCP PDUs, among the unacknowledged PDCP PDUs, have already been received by the network.

Second and third embodiments relating to uplink retransmission, which will be described next, relate to enhancements in the uplink direction based on reconstructing RLC SDUs from RLC PDUs delivered from the UE.

In a second embodiment relating to uplink retransmission, RLC SDUs may be reconstructed at the target DU. In particular, RLC PDUs may be buffered in the RLC layer of the source DU. RLC PDUs that contain only a portion of a RLC SDU, and the uplink RLC state, may be together forwarded to the target DU. The target DU may notify UE 101 to continue to transmit RLC PDUs. The notification may be performed in various ways, e.g., via RRC signaling or via a special RLC control PDU. Additionally, a RLC control PDU (e.g. RLC status report) may be sent to UE 101, so that the UE knows which RLC PDUs (among unacknowledged) have already been received by the network to avoid unnecessary retransmission. The RLC layer in the target DU may obtain the RLC state from the RLC layer of the source DU and reconstruct the complete RLC SDUs together with the RLC PDUs received from the UE.

In a third embodiment relating to uplink retransmission, RLC SDUs may be reconstructed at CU 205. In particular, RLC PDUs may be buffered in the RLC layer of the source DU and forwarded to CU 205. The uplink RLC state may be forwarded to the target DU so that target DU can determine the RLC state and continue receiving RLC PDUs delivered from the UE.

Additionally, in the third embodiment relating to uplink retransmission, the sequence numbers of those RLC PDUs forwarded to the CU may be provided to the RLC layer of the target DU so that the target DU can deliver RLC PDUs corresponding to the sequence numbers to CU 205 without buffering. CU 205 may then reconstruct the complete RLC SDUs. The network may send a RLC control PDU (e.g. RLC status report) so that the UE can determine which RLC PDUs (among the unacknowledged RLC PDUs) have already been received by the network to avoid unnecessary retransmission. The CU may reconstruct the RLC SDUs based on the RLC PDUs forwarded from the RLC layer of the source DU and the RLC PDUs delivered from the RLC layer of the target DU.

For the second and third embodiments relating to uplink retransmission, when reconstructing RLC SDUs (PDCP PDU), the dummy bits information, described previously with respect to FIG. 6, may be used. In particular, the source DU may, after detection of UE detachment, send combined PDCP PDU 600 as well as the RLC state information to CU 205 or directly to the target DU. If combined PDCP PDU 600 is sent to CU 205, CU 205 may notify the target DU of the sequence numbers of the RLC PDUs buffered at the RLC layer of the source DU and the range of the bits that should be retrieved from the UE as well as the RLC state information. The target DU, using the indicated RLC status and the information relating to the range of bits, may then retrieve the remaining bits from the UE and generate the combined PDCP PDU which cart be sent to CU 205. CU 205 may combine PDUs respectively from source and target DUs to re-construct the complete RLC SDUs, and send them to the PDCP entity.

A RAN may include multiple CUs 205, which may each be associated with multiple DUs. For a DU residing on the boundary of multiple CUs, the DU may be connected to multiple CUs. For a particular UE requiring seamless handover, the DU-CU connection may be changed from Source DU—Source CU to Source DU—Destination CU when the quality of the Uu Interface is still good. As a result, both the control plane (RRC) and the user plane (PDCP) of the UE may be relocated to the Destination CU. The Destination CU may have a global view of the underlying DUs including the potential Destination DU. Accordingly, the handover success rate can be improved for the next hop (from Source DU to the potential Destination DU)

As used herein, the term "circuitry," "processing circuitry," or "logic" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 7:
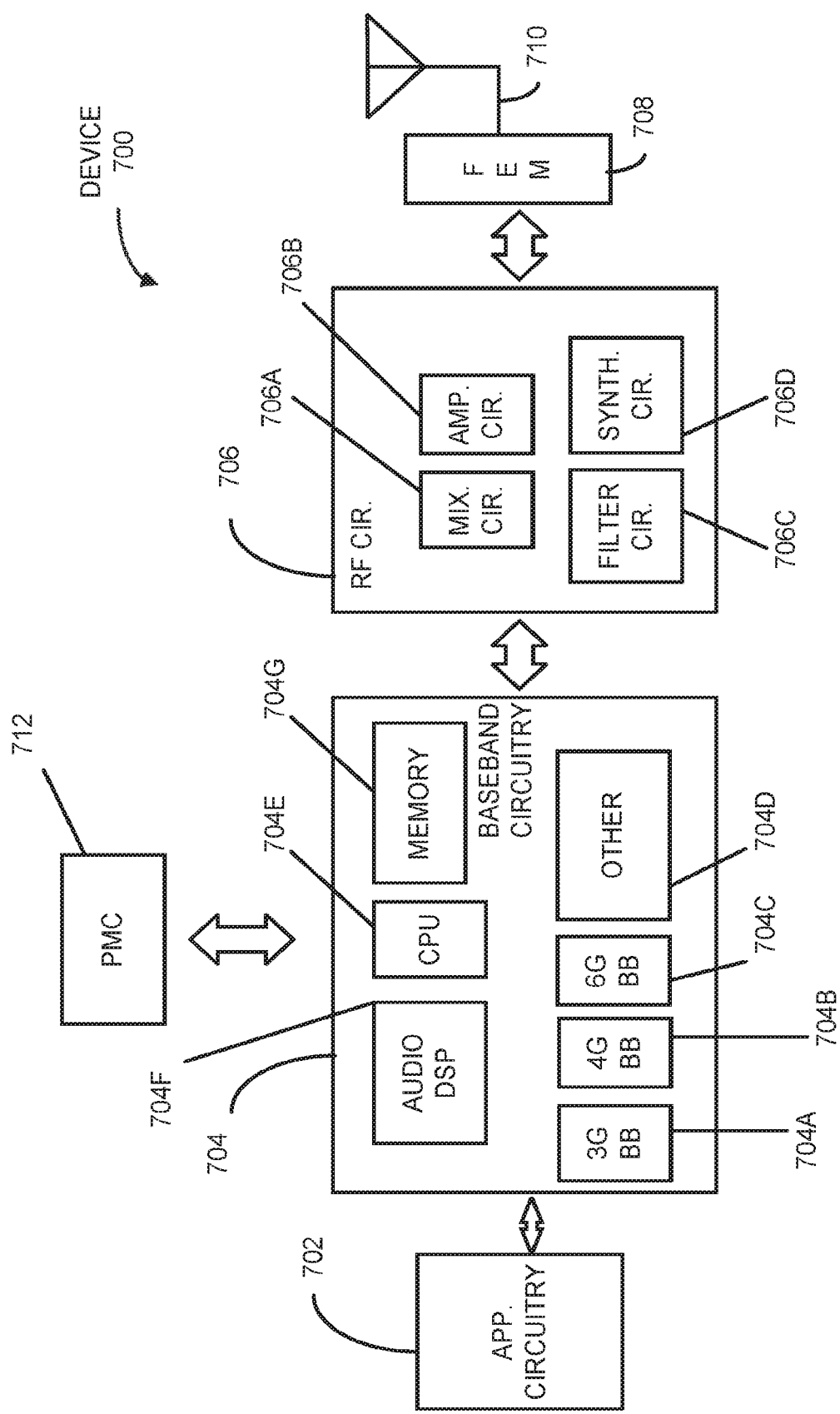
FIG. 7 illustrates example components of a device in accordance with some embodiments.

FIG. 7 illustrates example components of a device 700 in accordance with some embodiments. In some embodiments, the device 700 may include application circuitry 702, baseband circuitry 704, Radio Frequency (RF) circuitry 706, front-end module (FEM) circuitry 708, one or more antennas 710, and power management circuitry (PMC) 712 coupled together at least as shown. The components of the illustrated device 700 may be included in a UE or a RAN node. In some embodiments, the device 700 may include less elements (e.g., a RAN node may not utilize application circuitry 702, and instead include a processor/controller to process IP data received from an EPC). In some embodiments, the device 700 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 700. In some embodiments, processors of application circuitry 702 may process IP data packets received from an EPC.

The baseband circuitry 704 may include circuitry such as, but not limited to, one or more single-core or multi-core processors. The baseband circuitry 704 may include one or more baseband processors or control logic to process baseband signals received from a receive signal path of the RF circuitry 706 and to generate baseband signals for a transmit signal path of the RF circuitry 706. Baseband processing, circuitry 704 may interface with the application circuitry 702 for generation and processing of the baseband signals and for controlling operations of the RF circuitry 706. For example, in some embodiments, the baseband circuitry 704 may include a third generation (3G) baseband processor 704A, a fourth generation (4G) baseband processor 704B, a fifth generation (5G) baseband processor 704C, or other baseband processor(s) 704D for other existing generations, generations in development or to be developed in the future (e.g., second generation (2G), sixth generation (6G), etc.). The baseband circuitry 704 (e.g., one or more of baseband processors 704A-D) may handle various radio control functions that enable communication with one or more radio networks via the RF circuitry 706. In other embodiments, some or all of the functionality of baseband processors 704A-D may be included in modules stored in the memory 704G and executed via a Central Processing Unit (CPU) 704E. The radio control functions may include, but are not limited to, signal modulation/demodulation, encoding/decoding, radio frequency shifting, etc. In some embodiments, modulation/demodulation circuitry of the baseband circuitry 704 may include Fast-Fourier Transform (FFT), precoding, or constellation mapping/demapping functionality. In some embodiments, encoding/decoding circuitry of the baseband circuitry 704 may include convolution, tail-biting convolution, turbo, Viterbi, or Low-Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include one or more audio digital signal processor(s) (DSP) 704F. The audio DSP(s) 704F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 704 and the application circuitry 702 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path which may include circuitry to down-convert RF signals received from the FEM circuitry 708 and provide baseband signals to the baseband circuitry 704. RF circuitry 706 may also include a transmit signal path which may include circuitry to up-convert baseband signals provided by the baseband circuitry 704 and provide RF output signals to the FEM circuitry 708 for transmission.

In some embodiments, the receive signal path of the RF circuitry 706 may include mixer circuitry 706a, amplifier circuitry 706b and filter circuitry 706c. In some embodiments, the transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 704 and may be filtered by filter circuitry 706c.

In some embodiments, the mixer circuitry 706a of the receive signal path and the mixer circuitry 706a of the transmit signal path may include two or more mixers and may be arranged for quadrature downconversion and upconversion, respectively. In some embodiments, the mixer circuitry 706a of the receive signal path and the mixer circuitry 706a of the transmit signal path may include two or more mixers and may be arranged for image rejection (e.g., Hartley image rejection). In some embodiments, the mixer circuitry 706a of the receive signal path and the mixer circuitry 706a may be arranged for direct downconversion and direct upconversion, respectively. In some embodiments, the mixer circuitry 706a of the receive signal path and the mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RE circuitry 706 may include analog-to-digital converter (ADC) and digital-to-analog converter (DAC) circuitry and the baseband circuitry 704 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In some embodiments, the synthesizer circuitry 706d may be a fractional N/N+1 synthesizer.

In some embodiments, frequency input may be provided by a voltage controlled oscillator (VCO), although that is not a requirement. Divider control input may be provided by either the baseband circuitry 704 or the applications processor 702 depending on the desired output frequency. In some embodiments, a divider control input (e.g., N) may be determined from a look-up table based on a channel indicated by the applications processor 702.

Synthesizer circuitry 706d of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path which may include circuitry configured to operate on RF signals received from one or more antennas 710, amplify the received signals and provide the amplified versions of the received signals to the RF circuitry 706 for further processing. FEM circuitry 708 may also include a transmit signal path which may include circuitry configured to amplify signals for transmission provided by the RF circuitry 706 for transmission by one or more of the one or more antennas 710. In various embodiments, the amplification through the transmit or receive signal paths may be done solely in the RF circuitry 706, solely in the FEM 708, or in both the RF circuitry 706 and the FEM 708.

In some embodiments, the FEM circuitry 708 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 710).

In some embodiments, the PMC 712 may manage power provided to the baseband circuitry 704. In particular, the PMC 712 may control power-source selection, voltage scaling, battery charging, or DC-to-DC conversion. The PMC 712 may often be included when the device 700 is capable of being powered by a battery, for example, when the device is included in a UE. The PMC 712 may increase the power conversion efficiency while providing desirable implementation size and heat dissipation characteristics.

While FIG. 7 shows the PMC 712 coupled only with the baseband circuitry 704. However, in other embodiments, the PMC 712 may be additionally or alternatively coupled with, and perform similar power management operations for, other components such as, but not limited to, application circuitry 702, RF circuitry 706, or FEM 708.

In some embodiments, the PMC 712 may control, or otherwise be part of, various power saving mechanisms of the device 700. For example, if the device 700 is in an RRC_Connected state, where it is still connected to the RAN node as it expects to receive traffic shortly, then it may enter a state known as Discontinuous Reception Mode (DRX) after a period of inactivity. During this state, the device 700 may power down for brief intervals of time and thus save power.

If there is no data traffic activity for an extended period of time, then the device 700 may transition off to an RRC_Idle state, where it disconnects from the network and does not perform operations such as channel quality feedback, handover, etc. The device 700 goes into a very low power state and it performs paging where again it periodically wakes up to listen to the network and then powers down again. The device 700 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 702 and processors of the baseband circuitry 704 may be used to execute elements of one or more instances of a protocol stack. For example, processors of the baseband circuitry 704, alone or in combination, may be used execute Layer 3, Layer 2, or Layer 1 functionality, while processors of the application circuitry 704 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 8:
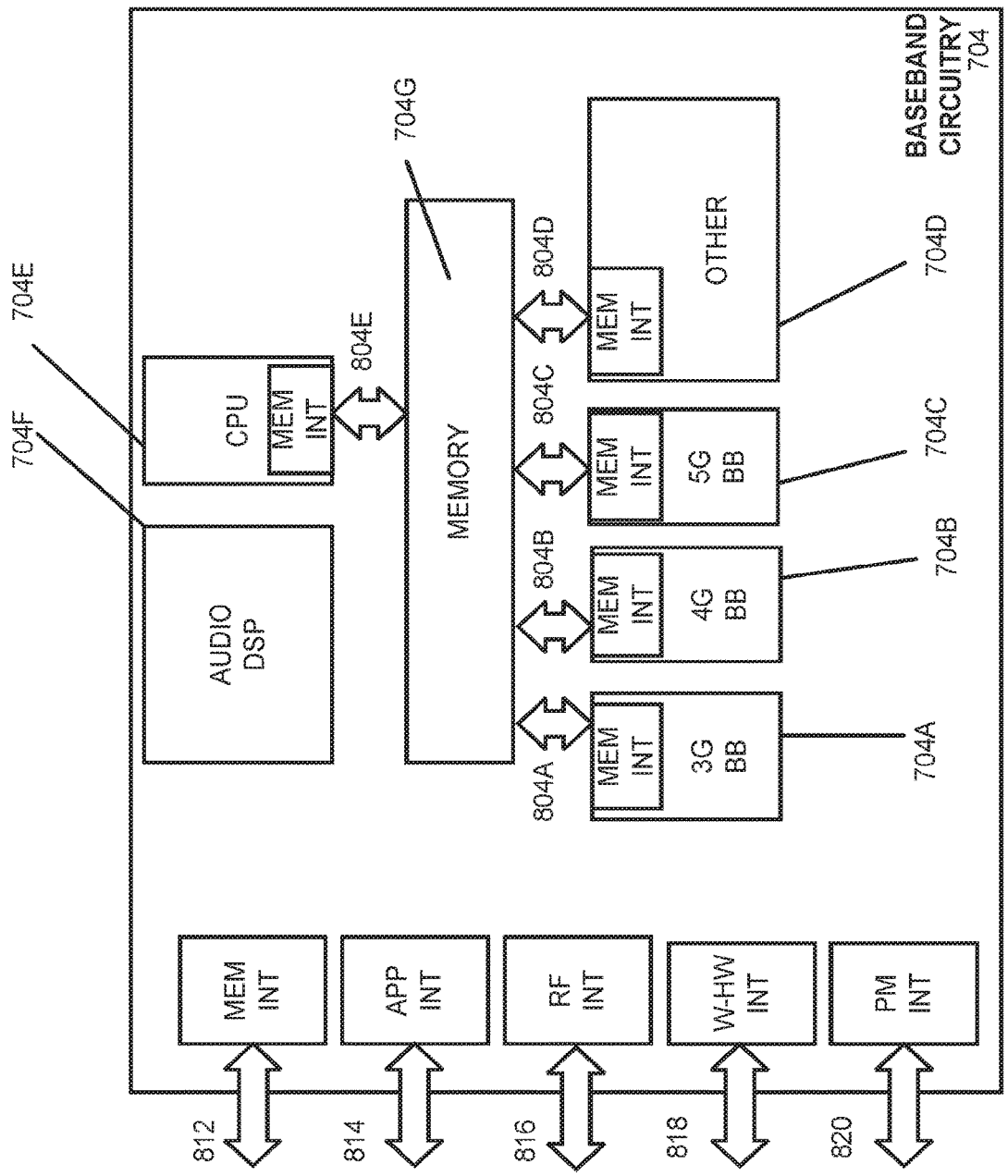
FIG. 8 illustrates example interfaces of baseband circuitry in accordance with some embodiments.

FIG. 8 illustrates example interfaces of baseband circuitry in accordance with some embodiments. As discussed above, the baseband circuitry 704 of FIG. 7 may comprise processors 704A-704E and a memory 704G utilized by said processors. Each of the processors 704A-704E may include a memory interface, 804A-804E, respectively, to send/receive data to/from the memory 704G.

The baseband circuitry 704 may further include one or more interfaces to communicatively couple to other circuitries/devices, such as a memory interface 812 (e.g., an interface to send/receive data to/from memory external to the baseband circuitry 704), an application circuitry interface 814 (e.g., an interface to send/receive data to/from the application circuitry 702 of FIG. 7), an RF circuitry interface 816 (e.g., an interface to send/receive data to/from RF circuitry 706 of FIG. 7), a wireless hardware connectivity interface 818 (e.g., an interface to send/receive data to/from Near Field Communication (NFC) components, Bluetooth® components (e.g., Bluetooth® Low Energy), Wi-Fi® components, and other communication components), and a power management interface 820 (e.g., an interface to send/receive power or control signals to/from the PMC 712.

Figure 9:
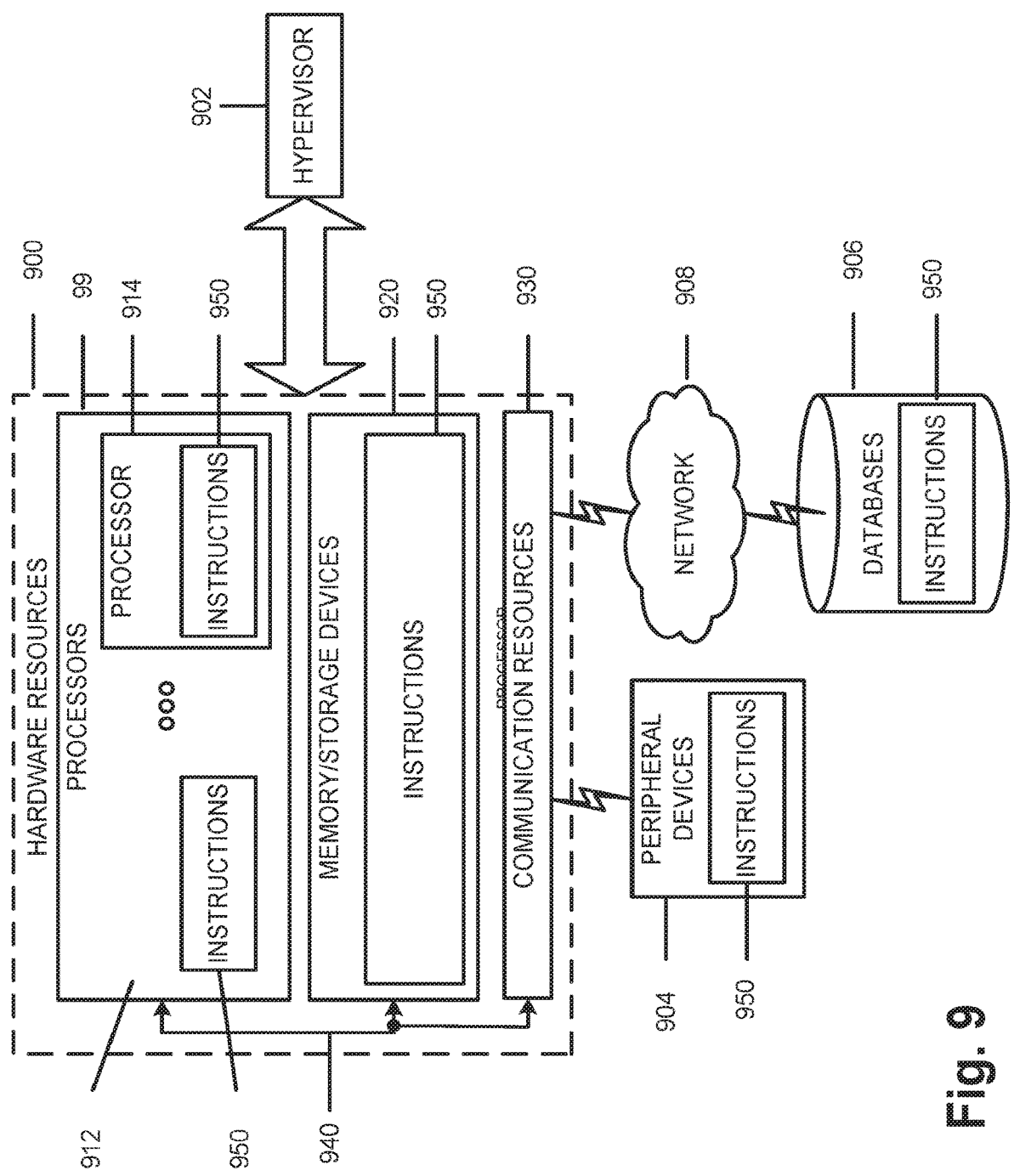
FIG. 9 is a block diagram illustrating components, according to some example embodiments, able to read instructions from a machine-readable or computer-readable medium (e.g., a non-transitory machine-readable storage medium) and perform any one or more of the methodologies discussed herein.

FIG. 9 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 9 shows a diagrammatic representation of hardware resources 900 including one or more processors (or processor cores) 910, one or more memory/storage devices 920, and one or more communication resources 930, each of which may be communicatively coupled via a bus 940. For embodiments where node virtualization (e.g., NFV) is utilized, a hypervisor 902 may be executed to provide an execution environment for one or more network slices/sub-slices to utilize the hardware resources 900

The processors 910 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 912 and a processor 914.

The memory/storage devices 920 may include main memory, disk storage, or any suitable combination thereof. The memory/storage devices 920 may include, but are not limited to any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

The communication resources 930 may include interconnection or network interface components or other suitable devices to communicate with one or more peripheral devices 904 or one or more databases 906 via a network 908. For example, the communication resources 930 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 950 may comprise software, a program, an application, an applet, an app, or other executable code for causing at least any of the processors 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 or the databases 906. Accordingly, the memory of processors 910, the memory/storage devices 920, the peripheral devices 904, and the databases 906 are examples of computer-readable and machine-readable media.

A number of examples, relating to implementations of the techniques described above, will next be given.

In a first example, a Centralized Unit of a Next Generation NodeB (gNB-CU) may comprise: circuitry to provide an interface to a plurality of Distributed Units of the Next Generation NodeB (gNB-DUs), the gNB-CU implementing Radio Resource Control (RRC) layer and Packet Data Convergence Protocol (PDCP) layer functionality of the gNB and the gNB-DUs implementing Radio Link Control (RLC) layer, Media Access Control (MAC) layer, Physical (PHY) layer, and Radio Frequency (RF) layer functionality of the gNB; and one or more processors to: detect that particular PDCP Protocol Data Units (PDUs) transmitted, via the circuitry to provide the interface, to a first gNB-DU of the plurality of gNB-DUs, were undelivered by the first gNB-DU to User Equipment (UE); and retransmit, via the circuitry to provide the interface and in response to the detection that the particular PDCP PDUs were undelivered, the particular PDCP PDUs to a second gNB-DU, of the plurality of gNB-DUs, to which the UE is attached.

In example 2, the subject matter of example 1, or any of the examples herein, wherein the detecting includes receiving an indication, from the first gNB-DU, that the particular PDCP PDUs were not successfully delivered to the UE.

In example 3, the subject matter of example 1, or any of the examples herein, wherein the detecting includes receiving an indication, from the first gNB-DU, of a radio link outage with the UE.

In example 4, the subject matter of example 1, or any of the examples herein, wherein the detecting is performed as part of a handover operation of the UE from the first gNB-DU to the second gNB-DU.

In example 5, the subject matter of examples 1-4, or any of the examples herein, wherein the one or more processors are further to: buffer the PDCP PDUs transmitted to the first gNB-DU until the PDCP PDUs have been successfully delivered to the UE.

In example 6, the subject matter of examples 1-4, or any of the examples herein, wherein the one or more processors are further to: receive, from the first gNB-DU, the particular PDCP Protocol Data Units (PDUs) that were undelivered to the UE.

In example 7, the subject matter of examples 1-4, or any of the examples herein, wherein the one or more processors are further to: cause, before retransmission of the particular PDCP PDUs, a PDCP status report from the UE, the status report indicating PDCP PDUs that have been received by the UE.

In an 8$^{th}$ example, an apparatus including a Centralized Unit of a Next Generation NodeB (gNB-CU) may comprise: a computer-readable medium containing program instructions; and one or more processors to execute the program instructions to: communicate with a plurality of Distributed Units of the Next Generation NodeB (gNB-DUs); detect that particular Packet Data Convergence Protocol (PDCP) Protocol Data Units (PDUs) transmitted to a first gNB-DU, of the plurality of gNB-DUs, were undelivered by the first gNB-DU, to User Equipment (UE); and retransmit, in response to the detection that the particular PDCP PDUs were undelivered, the particular PDCP PDUs to a second gNB-DU, of the plurality of gNB-DUs, to which the UE is attached.

In example 9, the subject matter of example 8, or any of the examples herein, wherein the detecting includes receiving an indication, from the first gNB-DU, that the particular PDCP PDUs were not successfully delivered to the UE.

In example 10, the subject matter of example 8, or any of the examples herein, wherein the detecting includes receiving an indication, from the first gNB-DU, of a radio link outage with the UE.

In example 11, the subject matter of example 8, or any of the examples herein, wherein the detecting is performed as part of a handover operation of the UE from the first gNB-DU to the second gNB-DU.

In example 12, the subject matter of examples 8-11, or any of the examples herein, wherein the one or more processors are further to execute the program instructions to: buffer the PDCP PDUs transmitted to the first gNB-DU until the PDCP PDUs have been successfully delivered to the UE.

In example 13, the subject matter of examples 8-11, or any of the examples herein, wherein the one or more processors are further to execute the program instructions to: receive, from the first gNB-DU, the particular PDCP Protocol Data Units (PDUs) that were undelivered to the UE.

In example 14, the subject matter of examples 8-11, or any of the examples herein, wherein the one or more processors are further to execute the program instructions to: cause, before retransmission of the particular PDCP PDUs, a PDCP status report from the UE, the status report indicating PDCP PDUs that have been received by the UE.

In a 15$^{th}$ example, a system to implement a portion of a Radio Access Network (RAN), may comprise: a plurality of Distributed Units of a Next Generation NodeB (gNB-DU), each of the plurality of gNB-DUs implementing Radio Link Control (RLC) layer, Media Access Control (MAC) layer, Physical (PHY) layer, and Radio Frequency (RF) layer functionality of the gNB; and a Centralized Unit of the Next Generation NodeB (gNB-CU), the gNB-CU being connected to the plurality of gNB-DUs, and the gNB-CU implementing Radio Resource Control (RRC) and Packet Data Convergence Protocol (PDCP) layer functionality of the gNB, the gNB-CU operating to: detect that particular PDCP Protocol Data Units (PDUs) transmitted to a first gNB-DU, of the plurality of gNB-DUs, were undelivered by the first gNB-DU to User Equipment (UE), and retransmit, in response to the detection that the particular PDCP PDUs were undelivered, the particular PDCP PDUs to a second gNB-DU, of the plurality of gNB-DUs, to which the UE is attached.

In example 16, the subject matter of example 15, or any of the examples herein, wherein the detecting includes receiving an indication, from the first gNB-DU, that the particular PDCP PDUs were not successfully delivered to the UE.

In example 17, the subject matter of example 15, or any of the examples herein, wherein the detecting is performed as part of a handover operation of the UE from the first gNB-DU to the second gNB-DU.

In example 18, the subject matter of example 15, or any of the examples herein, wherein the detecting includes receiving an indication, from the first gNB-DU, of a radio link outage with the UE.

In example 19, the subject matter of examples 15-18, or any of the examples herein, wherein the gNB-CU is further to: buffer the PDCP PDUs transmitted to the first gNB-DU until the PDCP PDUs have been successfully delivered to the UE.

In example 20, the subject matter of example 15-18, or any of the examples herein, wherein the gNB-CU is further to: receive, from the first gNB-DU, the particular PDCP Protocol Data Units (PDUs) that were undelivered to the UE.

In example 21, the subject matter of example 15-18, or any of the examples herein, wherein the gNB-CU is further to: cause, before retransmission of the particular PDCP PDUs, a PDCP status report from the UE, the status report indicating PDCP PDUs that have been received by the UE.

In a 22$^{nd}$ example, a method comprises: providing an interface to a plurality of Distributed Units of the Next Generation NodeB (gNB-DUs), the gNB-CU implementing Radio Resource Control (RRC) layer and Packet Data Convergence Protocol (PDCP) layer functionality of the gNB and the gNB-DUs implementing Radio Link Control (RLC) layer, Media Access Control (MAC) layer, Physical (PHY) layer, and Radio Frequency (RF) layer functionality of the gNB; detecting that particular PDCP Protocol Data Units (PDUs) transmitted, via the circuitry to provide the interface, to a first gNB-DU of the plurality of gNB-DUs, were undelivered by the first gNB-DU to User Equipment (UE); and retransmitting, via the circuitry to provide the interface and in response to the detection that the particular PDCP PDUs were undelivered, the particular PDCP PDUs to a second gNB-DU, of the plurality of gNB-DUs, to which the UE is attached.

In example 23, the subject matter of example 22, or any of the examples herein, wherein the detecting includes receiving an indication, from the first gNB-DU, that the particular PDCP PDUs were not successfully delivered to the UE.

In example 24, the subject matter of example 22, or any of the examples herein, wherein the detecting includes receiving an indication, from the first gNB-DU, of a radio link outage with the UE.

In example 25, the subject matter of example 22, or any of the examples herein, wherein the detecting is performed as part of a handover operation of the UE from the first gNB-DU to the second gNB-DU.

In example 26, the subject matter of examples 22-25, or any of the examples herein, further comprising: buffering the PDCP PDUs transmitted to the first gNB-DU until the PDCP PDUs have been successfully delivered to the UE.

In example 27, the subject matter of examples 22-25, or any of the examples herein, further comprising: receiving, from the first gNB-DU, the particular PDCP Protocol Data Units (PDUs) that were undelivered to the UE.

In example 28, the subject matter of examples 22-25, or any of the examples herein, further comprising: causing, before retransmission of the particular PDCP PDUs, a PDCP status report from the UE, the status report indicating PDCP PDUs that have been received by the UE.

In a 29th example, a computer readable medium may contain program instructions for causing one or more processors to: provide an interface to a plurality of Distributed Units of the Next Generation NodeB (gNB-DUs), the gNB-CU implementing Radio Resource Control (RRC) layer and Packet Data Convergence Protocol (PDCP) layer functionality of the gNB and the gNB-DUs implementing Radio Link Control (RLC) layer, Media Access Control (MAC) layer, Physical (PHY) layer, and Radio Frequency (RF) layer functionality of the gNB; detect that particular PDCP Protocol Data Units (PDUs) transmitted, via the circuitry to provide the interface, to a first gNB-DU of the plurality of gNB-DUs, were undelivered by the first gNB-DU to User Equipment (UE); and retransmit, via the circuitry to provide the interface and in response to the detection that the particular PDCP PDUs were undelivered, the particular PDCP PDUs to a second gNB-DU, of the plurality of gNB-DUs, to which the UE is attached.

In example 30, the subject matter of example 29, or any of the examples herein, wherein the detecting includes receiving an indication, from the first gNB-DU, that the particular PDCP PDUs were not successfully delivered to the UE.

In example 31, the subject matter of example 29, or any of the examples herein, wherein the detecting includes receiving an indication, from the first gNB-DU, of a radio link outage with the UE.

In example 32, the subject matter of example 29, or any of the examples herein, wherein the detecting is performed as part of a handover operation of the UE from the first gNB-DU to the second gNB-DU.

In example 33, the subject matter of examples 29-32, or any of the examples herein, wherein the program instructions further cause the one or more processors to: buffer the PDCP PDUs transmitted to the first gNB-DU until the PDCP PDUs have been successfully delivered to the UE.

In example 34, the subject matter of examples 29-32, or any of the examples herein, wherein the program instructions further cause the one or more processors to: receive, from the first gNB-DU, the particular PDCP Protocol Data Units (PDUs) that were undelivered to the UE.

In example 35, the subject matter of examples 29-32, or any of the examples herein, wherein the program instructions further cause the one or more processors to: causing, before retransmission of the particular PDCP PDUs, a PDCP status report from the UE, the status report indicating PDCP PDUs that have been received by the UE.

In the preceding specification, various embodiments have been described with reference to the accompanying drawings. It will, however, be evident that various modifications and changes may be made thereto, and additional embodiments may be implemented, without departing from the broader scope as set forth in the claims that follow. The specification and drawings are accordingly to be regarded in an illustrative rather than restrictive sense.

For example, while series of signals and/or operations have been described with regard to FIGS. 4 and 5, the order of the signals/operations may be modified in other implementations. Further, non-dependent signals may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used.

What is claimed is:

1. A Centralized Unit of a Next Generation NodeB (gNB-CU) comprising:
   circuitry to provide an interface to a plurality of Distributed Units of the Next Generation NodeB (gNB-DUs); and
   one or more processors to:
      buffer packet data convergence protocol (PDCP) Protocol Data Units (PDUs) already transmitted to a first gNB-DU of the plurality of gNB-DUs until the PDCP PDUs have been acknowledged to be successfully delivered to a user equipment (UE);
      receive an indication, from the first gNB-DU of the plurality of gNB-DUs, of a radio link outage between the first gNB-DU and the UE;
      detect that particular PDCP Protocol Data Units (PDUs) transmitted, via the circuitry to provide the interface, to the first gNB-DU from which the indication is received, were undelivered by the first gNB-DU to the UE; and
      retransmit, via the circuitry to provide the interface and in response to the detection that the particular PDCP PDUs were undelivered, the particular PDCP PDUs to a second gNB-DU, of the plurality of gNB-DUs, to which the UE is attached.

2. The gNB-CU of claim 1, wherein the detection that the particular PDCP PDUs were undelivered to the first gNB-DU is based on an indication, from the first gNB-DU, that the particular PDCP PDUs were not successfully delivered to the UE.

3. The gNB-CU of claim 1, wherein the one or more processors are further to:
   trigger, before retransmission of the particular PDCP PDUs, a PDCP status report from the UE, the PDCP status report indicating PDCP PDUs that have been received by the UE.

4. The gNB-CU of claim 1, wherein the gNB-CU implements Radio Resource Control (RRC) layer and Packet Data Convergence Protocol (PDCP) layer functionality of the gNB and the gNB-DUs implement Radio Link Control (RLC) layer, Media Access Control (MAC) layer, Physical (PHY) layer, and Radio Frequency (RF) layer functionality of the gNB.

5. An apparatus including a Centralized Unit of a Next Generation NodeB (gNB-CU) comprising:
one or more processors to:
communicate with a plurality of Distributed Units of the Next Generation NodeB (gNB-DUs);
buffer packet data convergence protocol (PDCP) Protocol Data Units (PDUs) already transmitted to a first gNB-DU of the plurality of gNB-DUs until the PDCP PDUs have been acknowledged to be successfully delivered to a user equipment (UE);
detect mobility of the UE receiving the PDCP PDUs from the first gNB-DU of the plurality of gNB-DUs to a second gNB-DU of the plurality of gNB-DUs;
detect that particular PDCP PDUs transmitted to the first gNB-DU from which the mobility of the UE is detected, were undelivered by the first gNB-DU, to the UE; and
retransmit, in response to the detection that the particular PDCP PDUs were undelivered, the particular PDCP PDUs to the second gNB-DU to which the mobility of the UE is detected.

6. The apparatus of claim 5, wherein the detection that the particular PDCP PDUs were undelivered to the first gNB-DU is based on an indication, from the first gNB-DU, that the particular PDCP PDUs were not successfully delivered to the UE.

7. The apparatus of claim 5, wherein the one or more processors are further to:
trigger, before retransmission of the particular PDCP PDUs, a PDCP status report from the UE, the PDCP status report indicating PDCP PDUs that have been received by the UE.

8. A system to implement a portion of a Radio Access Network (RAN), comprising:
a plurality of Distributed Units of a Next Generation NodeB (gNB-DU); and
a Centralized Unit of the Next Generation NodeB (gNB-CU), the gNB-CU being connected to the plurality of gNB-DUs, the gNB-CU operating to:
buffer packet data convergence protocol (PDCP) Protocol Data Units (PDUs) already transmitted to a first gNB-DU of the plurality of gNB-DUs until the PDCP PDUs have been acknowledged to be successfully delivered to a user equipment (UE);
receive an indication, from the first gNB-DU of the plurality of gNB-DUs, of a radio link outage between the first gNB-DU and the UE;
detect that particular PDCP PDUs transmitted to the first gNB-DU from which the indication is received, were undelivered by the first gNB-DU to the UE; and
retransmit, in response to the detection that the particular PDCP PDUs were undelivered, the particular PDCP PDUs to a second gNB-DU, of the plurality of gNB-DUs, to which the UE is attached.

9. The system of claim 8, wherein the detection that the particular PDCP PDUs were undelivered to the first gNB-DU is based on an indication, from the first gNB-DU, that the particular PDCP PDUs were not successfully delivered to the UE.

10. The system of claim 8, wherein the gNB-CU is further to:
trigger, before retransmission of the particular PDCP PDUs, a PDCP status report from the UE, the PDCP status report indicating PDCP PDUs that have been received by the UE.

11. The system of claim 8, wherein each of the plurality of gNB-DUs implements Radio Link Control (RLC) layer, Media Access Control (MAC) layer, Physical (PHY) layer, and Radio Frequency (RF) layer functionality of the gNB, and wherein the gNB-CU implements Radio Resource Control (RRC) and Packet Data Convergence Protocol (PDCP) layer functionality of the gNB.

* * * * *